United States Patent Office 3,424,209
Patented Jan. 28, 1969

3,424,209
DEVICE FOR HANDLING OBJECTS ON A CONVEYOR
Antoine Di Settembrini, Moulin de la Drille, Epouville, Seine-Maritime, France
Filed June 17, 1966, Ser. No. 558,343
Claims priority, application France, June 28, 1965, 22,535
U.S. Cl. 141—168                        1 Claim
Int. Cl. B65b 43/52

ABSTRACT OF THE DISCLOSURE

A device for positioning and temporarily holding against motion, at a working station, objects carried by a conveyor, notably for filling bottles made of a moderately rigid material. A first screen and a second screen are disposed beneath said working station respectively upstream and downstream thereof for stopping the objects on said conveyor. A plate positioned alongside the conveyor has a bevelled edge on the side registering with said conveyor and carries transverse screens. The positioning plate moves transversely of and above the conveyor within the area defined by the first and second screen for lifting the objects from the conveyor.

---

This invention is concerned in general with devices for positioning and holding against motion, at a predetermined working station, objects carried by a conveyor, and has specific reference to a device of this character which is particularly suitable for temporarily holding against motion relatively soft objects such as polyethylene bottles.

Various devices have already been proposed for simultaneously positioning and temporarily locking in position several objects which on the other hand travel in succession on a conveyor past a working station, for example for filling and capsuling or sealing bottles.

These known devices are based either on the use of a stopping screen moved by automatic means to its operative position in the path of the bottles in order to stop, in the line of bottles, a preselected number of bottles in front of an automatic filling machine, or on the use of a mechanism adapted to lift the desired number of bottles to a filling position, or alternately on the use of a screw-threaded shaft for feeding, stopping or centering the bottles.

However, none of these known devices can safely be used with objects, notably bottles, if these do not have a sufficient rigidity.

It is the object of this invention to provide a positioning device specially intended for this purpose, whereby operations such as filling, capsuling, sealing, etc., can be performed on objects of relatively moderate rigidity, such as polyethylene bottles and the like.

To this end, this device for positioning and temporarily holding against motion at a fixed working station objects travelling on a conveyor notably for filling bottles of relatively moderate rigidity, is characterized in that it comprises a first screen and a second screen movable in a transverse direction by a power member so as to stop the objects carried by the conveyor, said screens being disposed under said working station respectively upstream and downstream of the station, with respect to the direction of motion of said objects, a positioning support carrying transverse screens and actuated in a transverse direction by another power member so that they can be inserted under the objects stopped by the downstream screen and thus hold against motion a predetermined number of said objects in the proper position during the filling operation, and a device for producing a vertical relative movement between the working station proper and said support to permit the performance of the operation to be carried out at the working station.

The device according to this invention is applicable notably to machines for filling bottles of moderately rigid materials such as polyethylene.

The device of this invention is particularly simple in design and one of its essential features is that it can be adapted very easily to an in-line bottle-filling chain.

In order to afford a clearer understanding of this invention and of the manner in which the same may be carried out in practice, reference will now be made to a specific form of embodiment of the invention which is illustrated by way of example in the accompanying diagrammatic drawing.

Figure 1:
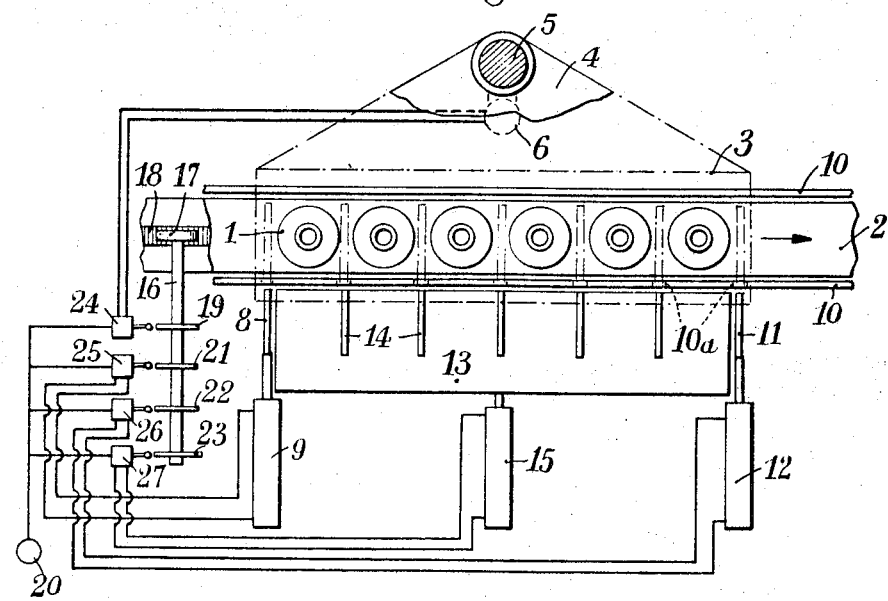
FIGURE 1 is a plan view of a device constructed according to the teachings of this invention and associated with a bottle-filling machine, the filling reservoir being shown only in chain-dotted lines in this view in order to simplify the drawing.

The device for positioning and locking bottles or like objects, according to this invention, is illustrated in the drawing as being associated with an automatic bottle-filling machine adapted to be incorporated in an in-line bottle-filling system or chain wherein the bottles 1 travel in succession on a conveyor 2 consisting for example of an endless belt or a plate chain.

The bottle-filling machine comprises a filling reservoir of the constant-level type 3, connected through a pipe line 3a to a main supply reservoir (not shown). This constant-level reservoir 3 is carried by a bracket 4 slidably mounted on a vertical post 5. The vertical displacement of reservoir 3 is controlled by a pneumatic piston and cylinder unit 6. This reservoir 3 has a plurality of lower extensions in the form of vertical filling nozzles 7 each equipped with a closing valve of any suitable type.

The bottles 1 travelling on the conveyor 2 may be stopped on the one hand by means of an upstream screen 8 moved in the transverse direction by a pneumatic piston cylinder unit 9, and on the other hand by a downstream screen 11 responsive to another piston and cylinder unit 12, the terms "upstream" and "downstream" referring of course to the direction of travel of the bottles 1. Besides, the word "screen" depicts any member capable of stopping the bottles and holding same laterally during the filling operation.

The bottles are positioned during the filling operation by means of a horizontal supporting plate 13 carrying transverse screens 14 at spaced intervals. This plate 13 actuated in the transverse direction by another piston and cylinder unit 15 has a bevelled front or leading edge 13a to facilitate its insertion between adjacent bottles.

The upstream and downstream transverse screens 8 and 11 respectively, as well as the screens 14 carried by the supporting plate 13, are adapted to be inserted in the path of the bottles through apertures 10a provided to this end in the lateral guide strip 10 of conveyor 2.

The various piston and cylinder units 6, 9, 12 and 15 of the bottle-filling machine are controlled by a common shaft 16 rotatably driven from a pinion 17 meshing with the chain 18 of conveyor 2. This camshaft 16 carries four cams 19, 21, 22 and 23 acting respectively on corresponding pneumatic valves 24, 25, 26 and 27 connected to a source of compressed air 20 and controlling the delivery of compressed air to said piston and cylinder units 6, 9, 12 and 15.

Figure 2:
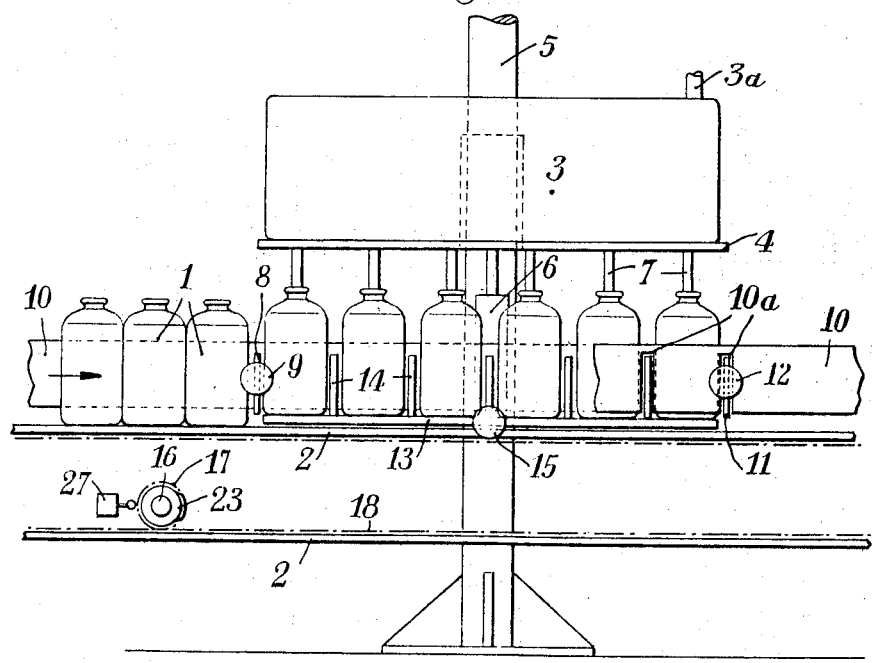
FIGURE 2 is an elevational view of the structure shown in FIGURE 1.
Figure 3:
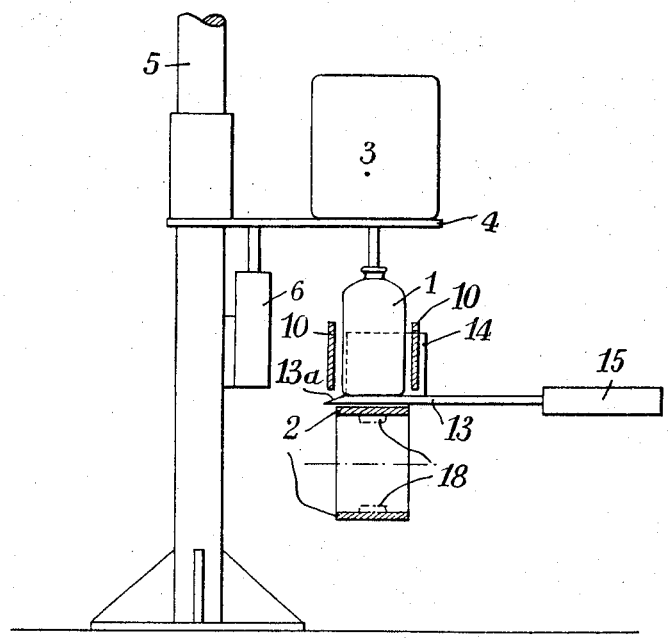
FIGURE 3 is a cross-sectional view of the same structure.

The automatic bottle-filling machine operates as follows:

The empty bottles are delivered to the filling station from the left-hand side, as seen in FIGURES 1 and 2, at a more or less regular rate. At a predetermined moment of the cycle the cam 21 actuates the pneumatic valve 25 to drive the piston of cylinder 9 outwards. Thus, the relevant transverse upstream screen 8 is moved upwards and interposed in the path of the empty bottles. The screen 8 associated with the piston and cylinder unit 9 is in its closed position as shown in FIGURE 1, the other screens 11 and 14 being in their open positions. Under these conditions, bottles are accumulated upstream of the screen 8.

Then the cam 21 restores the pneumatic valve 25 to its inoperative position and retracts the corresponding upstream screen 8. The bottles move to the right, as seen in FIGURES 1 and 2, but shortly before the leading bottle 1 reaches the downstream screen 11 the second cam 22 actuates the pneumatic valve 26 causing in turn the outward movement of the piston rod of cylinder 12. The downstream transverse screen 11 is then interposed in the path of the bottles and these are stopped on the upstream side of this screen. In the example illustrated it is assumed that six bottles can be filled at the same time during each cycle of operation of the machine. Therefore, at the most six bottles can be held against motion between the upstream and downstream screens 8 and 11 respectively.

With the bottles stopped by the downstream screen 11 in its closed position, the next cam 23 will actuate another valve 27 causing in turn the piston rod of cylinder 15 to be retracted therefrom. Thus, the supporting plate 13 and the transverse screens 14 are pushed towards the bottles 1 still held against motion by the downstream screen 11. The bevelled leading edge of the supporting plate 13 is inserted under the bottles and the screens 14 passing through the aperture 10a of the lateral guide member 10 are inserted between the adjacent bottles, in order properly to position same. The bottles are thus retained on the supporting plate 13 and each bottle registers with the corresponding overlying filling nozzle 7.

Then the came 21 actuates the pneumatic valve 25 causing the outward movement of the piston rod of cylinder 9, and closing the upstream screen 8. The latter will then stop the bottles travelling on the conveyor 2.

The pneumatic valve 24 is subsequently actuated by the cam 19 controlling the piston and cylinder unit 6, whereby the reservoir 3 is lowered and then the bottles 1 retained on the supporting plate 13 are filled. During this actual filling operation the bottles, which may consist of relatively soft plastic material such as polyethylene, are supported laterally by the screens 14.

Upon completion of the filling operation, the cam 19 actuates the valve 24 and controls the upward stroke of reservoir 3. On the other hand, cams 22 and 23 control their corresponding valves 26 and 27 respectively for retracting the plate 13, screens 14 and downstream screen 11. The filled bottles then continue their travel on conveyor 2 and the cycle is resumed.

On the other hand, it is clear that the specific form of embodiment of the invention which is described hereinabove with reference to the attached drawing is given by way of example only and should not be construed as limiting the scope of the invention since many modifications may be brought thereto without departing from the spirit of the present invention.

Thus, notably, instead of moving the filling reservoir 3 vertically, the movable supporting plate 13 may be mounted for vertical motion under the control of a piston and cylinder unit, the reservoir 3 being stationary. In this case, two different motions would be impressed to the supporting plate 3, namely a horizontal motion and a vertical motion, under the control of two separate piston and cylinder units.

Besides, the screens 8, 11 and 14 may have any shape consistent with the shape of the bottles to be supported or retained thereby during the filling operation.

I claim:

1. A device for positioning and temporarily holding against motion objects carried by a conveyor, notably for filling bottles made of a moderately rigid material which comprises a first screen and a second screen, a first power member and a second power member adapted to move said first and second screens transversely to the path of said objects for stopping same on said conveyor, a positioning plate positioned alongside the conveyor and having a bevelled edge on the side registering with said conveyor, transverse screens carried by said positioning plate, and a third power member adapted to move said positioning plate transversely of and above the conveyor within the area defined by the first and second screen, for inserting said plate under the objects stopped between said first and second screens, for lifting said objects from the conveyor and for holding them against motion.

References Cited

UNITED STATES PATENTS 2,778,389    1/1957    McGillivray _____ 141—276 X
3,067,786    12/1962    Rosen _____ 141—179

FOREIGN PATENTS 1,062,162    7/1959    Germany.

SAMUEL ROTHBERG, *Primary Examiner.*

EDWARD J. EARLS, *Assistant Examiner.*

U.S. Cl. X.R.

141—180; 198—19